United States Patent [19]
Dixon

[11] Patent Number: 6,132,486
[45] Date of Patent: Oct. 17, 2000

[54] POWDERED METAL ADMIXTURE AND PROCESS

[75] Inventor: James N. Dixon, DuBois, Pa.

[73] Assignee: Symmco, Inc., Sykesville, Pa.

[21] Appl. No.: 09/189,162

[22] Filed: Nov. 9, 1998

[51] Int. Cl.[7] .................. B22F 3/26; B22F 1/00; B22F 1/04
[52] U.S. Cl. .................. 75/247; 419/27; 419/32; 419/36; 419/57; 419/58
[58] Field of Search .................. 419/57, 27, 32, 419/36, 58; 75/247

[56] References Cited

U.S. PATENT DOCUMENTS

| | | |
|---|---|---|
| 2,831,243 | 4/1958 | Thomson . |
| 4,365,996 | 12/1982 | Melton et al. ............ 419/28 |
| 4,608,085 | 6/1986 | Eudier et al. . |
| 4,614,544 | 9/1986 | Lall ............ 75/246 |
| 4,681,629 | 7/1987 | Reinshagen ............ 75/246 |
| 4,935,056 | 6/1990 | Miyasaka . |
| 5,125,962 | 6/1992 | Krentscher ............ 75/247 |
| 5,637,132 | 6/1997 | Matthews et al. ............ 75/252 |

FOREIGN PATENT DOCUMENTS 1659510  6/1991  Russian Federation .

*Primary Examiner*—Ngoclan Mai
*Attorney, Agent, or Firm*—Thorp Reed & Armstrong

[57] ABSTRACT

A process of forming a multi-phase sintered article of powdered metal comprising: blending a mixture of copper powder, aluminum powder, iron powder, and nickel, each in their free states, with a lubricant, compacting the blended mixture into a die cavity, forming the article, and high temperature sintering the article in a reducing atmosphere comprised of 100% dissociated ammonia so as to produce the multi-phase sintered article of powdered metal; and the multi-phase sintered article of powdered metal formed thereby.

48 Claims, 5 Drawing Sheets

POWDERED METAL ADMIXTURE AND PROCESS

BACKGROUND OF THE INVENTION

1. Field of the Present Invention

The present invention relates broadly to a powdered metal ("P/M") admixture and a method or process of forming a P/M admixture. More particularly, the invention relates to a P/M multi-phase bronze material for bearings/bushings and structural parts and a process of forming a PIM multi-phase bronze material for bearings/bushings and structural parts. The resultant parts are characterized as being lighter weight, stronger parts at net shape than conventional cast metal bronze material parts.

2. Description of the Background

P/M technology is a highly developed method of manufacturing reliable ferrous and nonferrous parts. PIM technology is well known to persons skilled in the art and typically consists of three (3) basic steps of mixing elemental or alloy powders, compacting the mixture into a die and sintering the resultant shapes in a controlled atmosphere furnace to bond the particles metallurgically. Those steps may be followed by optional secondary operations, one of which is oil impregnation.

P/M technology is a relatively inexpensive process that results in high volume production. Basically a "chipless" metalworking process, powdered metallurgy typically uses more than 97% of the starting raw material in the finished part. Also, only minor, if any, machining is required on the P/M parts and they maintain close dimensional tolerances. Because of this, P/M processing is an energy and materials conserving process. It is well known in the art to produce many different products comprised of many different metals through P/M technology, examples of which are bronze bearings/bushings and structural parts.

P/M bronze parts are commonly produced by blending pre-alloyed metals into a mixture, compacting the mixture, and sintering the product in a 90/10 atmospheric mix of nitrogen/dissociated ammonia ("$N_2/A$") at 1625–1650° F. (885–899° C.). P/M technology is very product specific and each variable, such as sintering time, temperature, atmospheric conditions, compacting pressure, etc., is dependent upon the starting materials to be used and the desired resultant product characteristics.

Most properties of a P/M metal part are closely related to its final density. This density is the mass per unit volume of the part expressed in grams per cubic centimeter ($g/cm^3$). Density is also expressed as relative density, which is defined as the ratio of a P/M part's density to that of its pore-free equivalent. As with wrought and cast metals, chemical composition of P/M parts strongly influences the mechanical properties of strength, ductility, hardness (apparent) and particle hardness.

It is well known in the art to use the concept of minimum values of properties for P/M materials. These values, such as oil content and radial crushing force, may be used in designing for a P/M bearing application. It is seen as an advantage of the P/M process that equivalent properties can oftentimes be developed by varying chemical composition, particle configuration, density and/or processing techniques. The grade of material that is selected is determinant upon the design of the part and its end use, including dimensional tolerances, as well as other characteristics such as density, porosity, compressive strength, corrosion resistance, oil content, surface finish, and any other pertinent requirements.

While P/M technology is employed to produce a wide range of parts comprised of a variety of raw materials; some materials and resultant parts currently may not be produced using conventionally known P/M technology processes.

Typically, aluminum bronze bearings/bushings and structural parts are cast-metal foundry products. These cast products are desirable because they are characterized as having a high degree of strength. However, they are also characterized as being fully dense, that is, they have no porosity, therefore they do not take favorably to oil impregnation and are also quite weighty. Another disadvantage of this process is that casting and then machining these parts often results in a relatively low volume production, as this process is often time intensive. Additionally, casting and then machining parts may be costly as well. Therefore, it is often preferable to form parts through P/M technology rather than through casting if at all possible.

Yet, forming aluminum bronze products through conventionally known P/M technology has not produced a product with the desired characteristics, for example, a specified high degree of strength. Therefore, there is a need in the art to produce aluminum bronze multi-phase parts that are lighter weight with increased strength, and that have fully dense properties at a lower density to allow for oil impregnation, through a relatively inexpensive process that results in high volume production.

SUMMARY OF THE INVENTION

Accordingly, the present invention relates to a P/M material for bearings/bushings and structural parts and a process of forming a P/M material for bearings/bushings and structural parts.

The present invention provides a process of forming a sintered article of powdered metal comprising the steps of blending a mixture of metallic powders, such as copper powder, aluminum powder, iron powder and nickel with a lubricant, loading the blended mixture into a die cavity, compacting the blended mixture in the die cavity to form the article, and high temperature sintering the article in a reducing atmosphere comprised of 100% dissociated ammonia ("DA"). The blended mixture may comprise, by % per volume mixing (+/−0.5%): 80% copper powder, 11% aluminum powder 5% iron powder and 4% nickel with a lubricant. The metals in the blended mixture are in their free state, and are sintered at temperature ranges between 1000°–1835° F. (538°–1002° C.). The lubricant is preferably stearic acid.

The present invention also provides a process wherein the sintered article is impregnated with a lubricant to provide self-lubricating properties.

The present invention further provides a sintered powdered metal part comprising a body formed into a shape of a part using metal powder, which body is sintered in an atmosphere of DA. Another feature of the present invention is that the body further comprises a microstructure having the appearance of a multi-phase material. That is, this material's structure is made up of several phases. This defines the forming of or alloying of the metals in the mix at different temperatures. The metal powder is comprised of metals in their free state and the sintering atmosphere is preferably 100% DA. In one embodiment of the present invention, the sintered powdered metal is comprised of aluminum, copper, iron and nickel. The sintered powdered metal mixture may be comprised of 80% copper, 11% aluminum, 5% iron, and 4% nickel. Another feature of the sintered powdered metal part is that the part has fully dense properties at approximately 80% density.

The present invention further provides a process of forming a sintered article of powdered metal comprising the steps of blending a mixture of free state metals with a lubricant, compacting the blended mixture in a die cavity to form a green article, and high temperature sintering the green article in a reducing atmosphere comprised of approximately 100% DA. In another feature of the present invention, the article is sintered in a furnace which has been seasoned with 50% DA and 50% $N_2$ for 3 hours prior to sintering.

The present invention further provides a sintered metal part comprising a body formed into a pre-shaped part using metal powder, the pre-shaped part having a 200–300 lbs. crush test value, the body being sintered in an atmosphere of DA, and the body further comprising a microstructure having the appearance of a multi-phase material. The sintered metal part preferably comprises aluminum, copper, iron and nickel metals, in powder form, in their free state. The sintered powdered metal part has fully dense properties at approximately 80% density.

DETAILED DESCRIPTION OF THE PREFERRED EMBODIMENT

The P/M manufacturing process of the present invention employs a number of processing steps unique to the formation of the P/M material of the present invention. Two or more metals, such as aluminum, copper, iron and nickel P/M materials are blended with a lubricant, preferably stearic acid, to form an admixture. The lubricant may serve both functions of lubrication and binding the individual particles together. The P/M starting materials preferably comprise individual elements or metals in their free state, rather than pre alloyed materials. These free state metals are each preferably blended together in their own powder form, that is, each powder having been previously processed by itself, with no other type of alloying occurring before the completion of this mixing.

The oxide levels and carbon content of these starting materials are preferably very low, as this number corresponds to the quantity of oxides targeted to be removed during the sintering process. All metal particles have some form of oxide coating that must be removed to achieve the desired sintering. The lower the oxide levels on the raw material that must be removed during the sintering process, the more improved the mechanical properties of the resultant product. Table 1 provides a listing of commercial grade standard raw materials that may be used in practicing the invention. All amounts noted in the properties section of Table 1 are at a maximum value.

TABLE 1

Raw Material Purchase Standards

| Commercial name | Properties | Supplier |
|---|---|---|
| Iron Powder - Ancormet 101 | Carbon % = 0.20, Hydrogen Loss % −0.25** | Hoeganaes |
| Copper Powder | 150RXM-1230MG, Hydrogen Loss % = 0.08 | OMG America |
| Nickel-Grade INCO 123 | | INCO from AcuPowder, Inc. |
| Aluminum Powder - AM650 STD | | AMPAI, Inc. |
| Stearic Acid - Grade 9018 | | Textile Chemical Co., Inc. |

*All noted materials above may be purchased in the U.S. (and also may be manufactured in the U.S.)
**Hydrogen loss is used as a technical term for sintering purposes to assist in the atmosphere reducing capability required.

Prior art blending cycle times in the industry are from 30–60 minutes. This is due to the general belief that blending for over 60 minutes causes the particles to break down in addition to other processing problems. However, in the preferred embodiment of the present invention the blending cycle lasts for approximately 2 hours. It is believed that some form of mechanical alloying between the nickel and aluminum occurs during this blending cycle. This mechanical alloying during blending may therefore explain the liquid state temperature change for nickel.

In one embodiment the metals may be added to the blender as loose powder in layers. Before tumbling or blending occurs, the nickel and the aluminum are in general contact with one another as a result of being loaded into the blender. During blending some form of mechanical alloying between nickel and aluminum is believed to occur.

Figure 1:
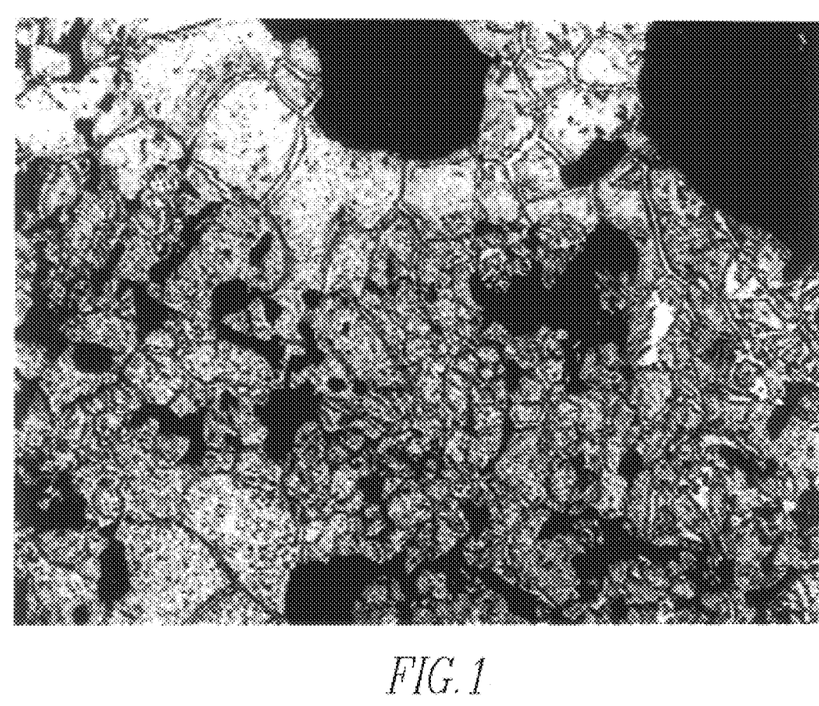
FIG. 1 is a photomicrograph which shows the multi-phase structure of fine grain bronze, $Fe_3Al$ and $Ni_3Al$.

FIG. 1 is a photomicrograph which shows the multi-phase structure of fine grain bronze, $Fe_3Al$ and $Ni_3Al$. As shown in FIG. 1, the $Ni_3Al$ comes out as a single phase the size of 2–3 microns at 950×power scope after the standard cooling cycle.

The admixture is then compacted into a die cavity to form a pre-form or green article preferably using approximately 25 psi of pressure (+5 psi/−5 psi). The lubricant, previously added to the powdered metals to form the admixture, reduces friction in the die cavity and also eases removal of the pre-form from the die cavity. The aluminum bronze pre-form is very strong, with a 200–300 lbs. crush test value or crush factor. Crush factor is a procedure test that relates to several important factors used in the P/M industry. The data from the crush procedure: (1) defines the quality check of the sintering process, (2) defines the capability of the part for performance under load, that is, can the part meet the mechanical requirements of the application, and (3) is used to develop the strength constant ("K") factor calculation also relating to functional use. Also, the surface tension/surface energy of the pre-form part at the green boundaries may be categorized as high. This characteristic may be attributable to the low density of aluminum.

Next the aluminum bronze is sintered in an environment preferably comprised of substantially 100% DA. The hydrogen in the atmosphere removes or cleans off the surface oxides on the part. Specifically, the $H_2$ from the DA develops a reducing atmosphere that chemically forms with the oxide to remove it from the particle. This allows the particles of the part to bond during the sintering process, which aids in the alloying process, and allows the compacted product to develop the appropriate strength. The removal of the oxides allows for necking or grain boundry bonding which give the material the desired mechanical properties.

Sintering in an atmosphere of DA is common in the industry. However, sintering in an atmosphere of DA used at 100% volume is almost exclusively done in the area of stainless steel. The balance of the use of DA in the industry for a sintering atmosphere is a 90/10 $N_2$/DA atmospheric mixture. The conventional sintering atmosphere for bronze is the 90/10 $N_2$/DA mixture. However, sintering the article of the present invention in the conventional atmosphere of 90/10 $N_2$/DA did not produce an article with the desired mechanical properties, such as strength.

In one embodiment of the present invention, the green parts enter a furnace with zones that may be designated at pre-heat, high heat and cooling. The pre-heat zone allows the material to gradually increase in temperature to the desired sintering temperature. It is believed that, in the pre-heat zone, reduction of the metal oxides occurs and that, at approximately 1200° F. (649° C.) the aluminum combines with the iron and develops into an iron aluminum metallic compound ($FeAl_3$). The parts move through the pre-heat zone in a time period from about 30–40 minutes, after which point they enter the high heat zone.

At 1850°–1875° F. (1010°–1024° C.)(+10/–0° F.) copper and nickel alloying occurs. The strength of the product, when sintered in an atmosphere comprised of 100% DA, increases by 40% oversintering the product in the prior art atmosphere for standard bronze, i.e. 90% 90/10 $N_2$/DA. The resultant parts are characterized as having fully dense properties at 80% density, which allows for oil impregnation.

After traveling through the hot zone of the furnace, the parts enter the cooling zones, in which zones the parts are gradually cooled down. The temperature in the cooling down zones gradually decreases to approximately 70° F. (21° C.), (+10/–0° F.). While traveling through the cooling zones the aluminum bronze parts preferably undergo a surface hardening step in which, under controlled conditions, the parts are exposed to a nitrogen-containing atmosphere, or at least one nitrogen curtain box.

As previously mentioned, the use of elements in their free state allows the alloying to be completed in the sintering process, which establishes the multi-phase structure. This develops the higher mechanical properties at the lower density levels versus other present materials. Each material has a minimum specification required from its respective manufacturer. These minimum specification requirements are also important to the success of the alloying during the sintering process. By using the individual metals in their free state, the sintering reaction or cycle sequence changes to allow for phase and/or metallic compounds to form at temperatures not normally related to prior history of these materials.

Figure 2:
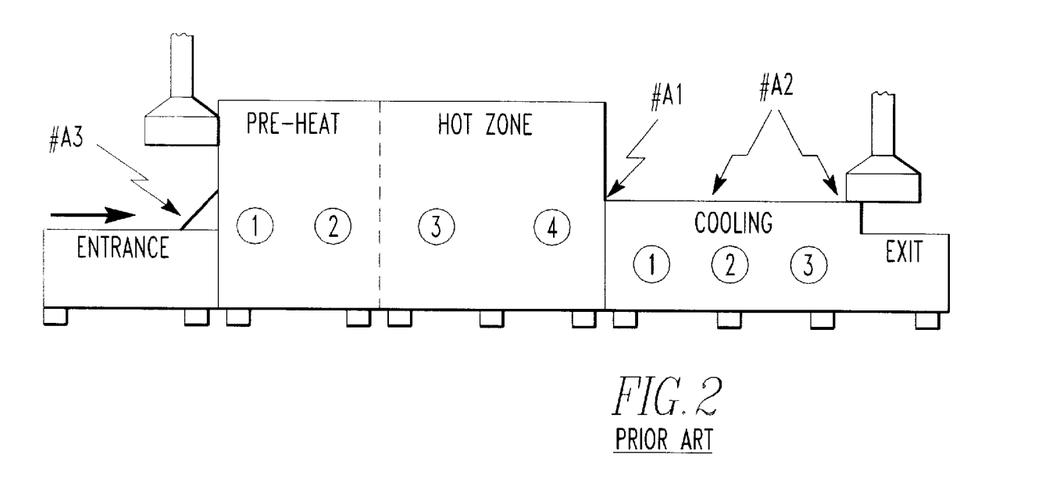
FIG. 2 is a graphic representation of a prior art bronze material sintering, more specifically, the furnace/sintering cycle and conditions for sintering SYM1 or SYM2 grade bronze material.

FIG. 2 is a graphic representation of a prior art bronze material P/M sintering cycle. FIG. 2 displays the furnace/ sintering cycle and conditions for sintering SYM1 or SYM2 grade bronze material. For producing these materials, the sintering temperatures for each zone should be as follows:

| Zone 1 | 1000° F. (538° C.) |
| Zone 2 | 1200° F. (649° C.) |
| Zone 3 | 1580° F. (860° C.) |
| Zone 4 | 1650° F. (899° C.) |
| Cooler 1 | 125° F. (52° C.)) |
| Cooler 2 | 100° F. (38° C.) |
| Cooler 3 | 70° F. (21° C.) |

The atmospheric condition conditions should be as follows:

Location #A1—90/10.$N_2$/DA

Locations #A2—$N_2$ loaded

Location #A3—$CH_3$ flame curtain in entrance area.

Figure 5:
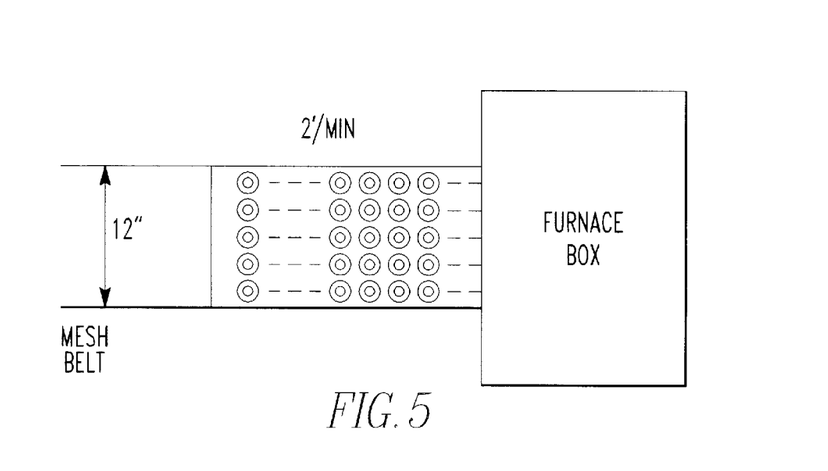
FIG. 5 is an overhead view of the conveyor belt system/furnace box system utilized in the sintering process of SYM1 or SYM2 grade bronze material and aluminum bronze SYM10.

FIG. 5 portrays an overhead view of the conveyor belt system/ furnace box system utilized in prior art sintering processing. The belt speed should be set at 2"/minute (5.08 cm/minute). The parts are preferably stacked on the conveyor belt in single layer rows horizontally across the width of the belt. The horizontal rows of parts should preferably be in lines ½" (1.27 cm) apart on the belt and the parts in each vertical row are ¼" (0.64 cm) apart across the width of the belt. It is important to realize that the belt speed and stacking width and depth of the parts on the belt may be varied depending on part design and size.

Figure 3:
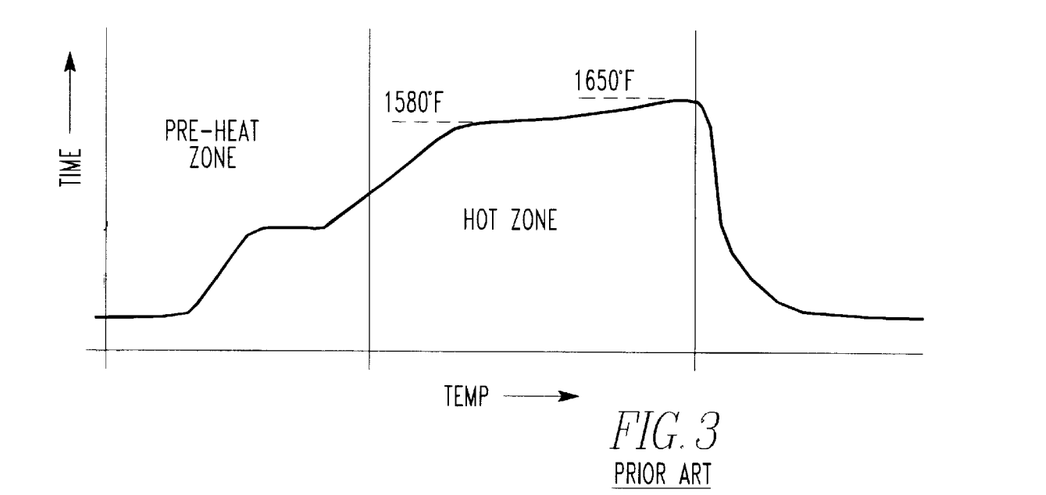
FIG. 3 is a graphic representation of temperature versus time for either a prior art SYM1 or SYM2 grade bronze material part as they are carried through the pre-heat zone and through the hot zone.

FIG. 3 portrays a graphic representation of temperature versus time for either SYM1 or SYM2 grade bronze material parts as they are carried by the belt through the zones of a prior art P/M process.

Figure 4:
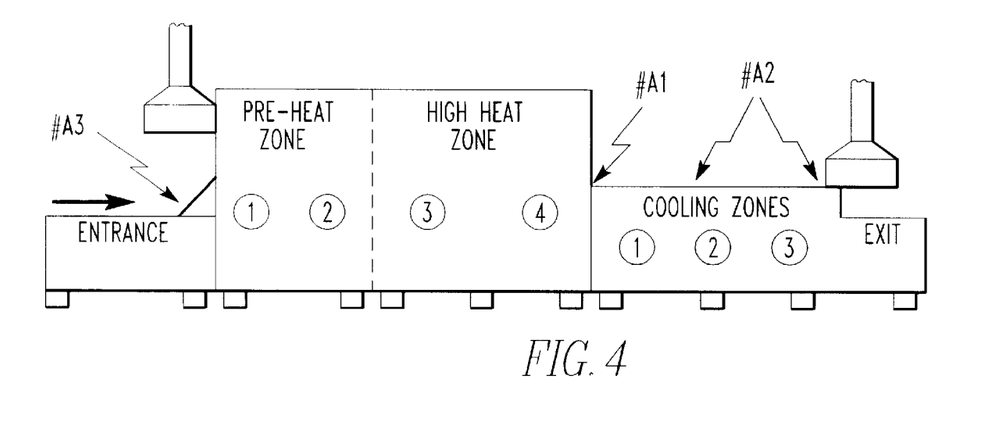
FIG. 4 is a representation of the furnace set-up for sintering aluminum bronze according to the present invention.

FIG. 4 portrays a basic outline of the furnace set-up which is utilized for sintering an aluminum bronze product, according to the present invention. This example illustrates one of the ways the present invention can be practiced. This is one example and is not exhaustive and is not intended to limit the scope of the invention. For producing a preferred embodiment of the material of the invention referred to as SYM10, the sintering temperatures for each zone should be as follows:

| Zone 1 | 1000° F. (538° C.) |
| Zone 2 | 1000° F. (538° C.) |
| Zone 3 | 1810° F. (988° C.) |
| Zone 4 | 1835° F. (1002° C.) |
| Cooler 1 | 125° F. (52° C.) |
| Cooler 2 | 100° F. (38° C.) |
| Cooler 3 | 70° F. (21° C.) |

The atmospheric conditions should be as follows:

Location #A1—100% DA

Locations #A2—$N_2$ loaded

Location #A3—$CH_3$ flame curtain in entrance area.

The overhead view of the conveyor belt system/furnace box system of FIG. 5 may also be used in the sintering process of aluminum bronze SYM10 of the present invention. This will allow the utilization of previously purchased conveyor/ furnace systems in practicing the new process. As with the processing of bronze SYM1 or SYM2, the belt speed should be set at 2"/minute (5.08 cm/minute). The parts should be stacked on the conveyor belt in single layer rows horizontally across the width of the belt. The horizontal rows of parts should preferably be in lines ½" (1.27 cm) apart on the belt and the parts in each vertical row are ¼" (0.64 cm) apart across the width of the belt. Again, it is important to realize that the belt speed and stacking width and depth of the parts on the belt may be varied depending on part design and size.

The furnace is preferably seasoned with 50% DA and 50% $N_2$ for three (3) hours prior to processing the parts in order to obtain the desired atmospheric conditions. "Seasoning" as used in the sintering process, defines control of unwanted materials inside the furnace that could be absorbed into the part through a chemical reaction with the part and the atmosphere. To remove these unwanted materials from the furnace, it is preferable to season with the same type of atmosphere as utilized in the sintering process.

Figure 6:
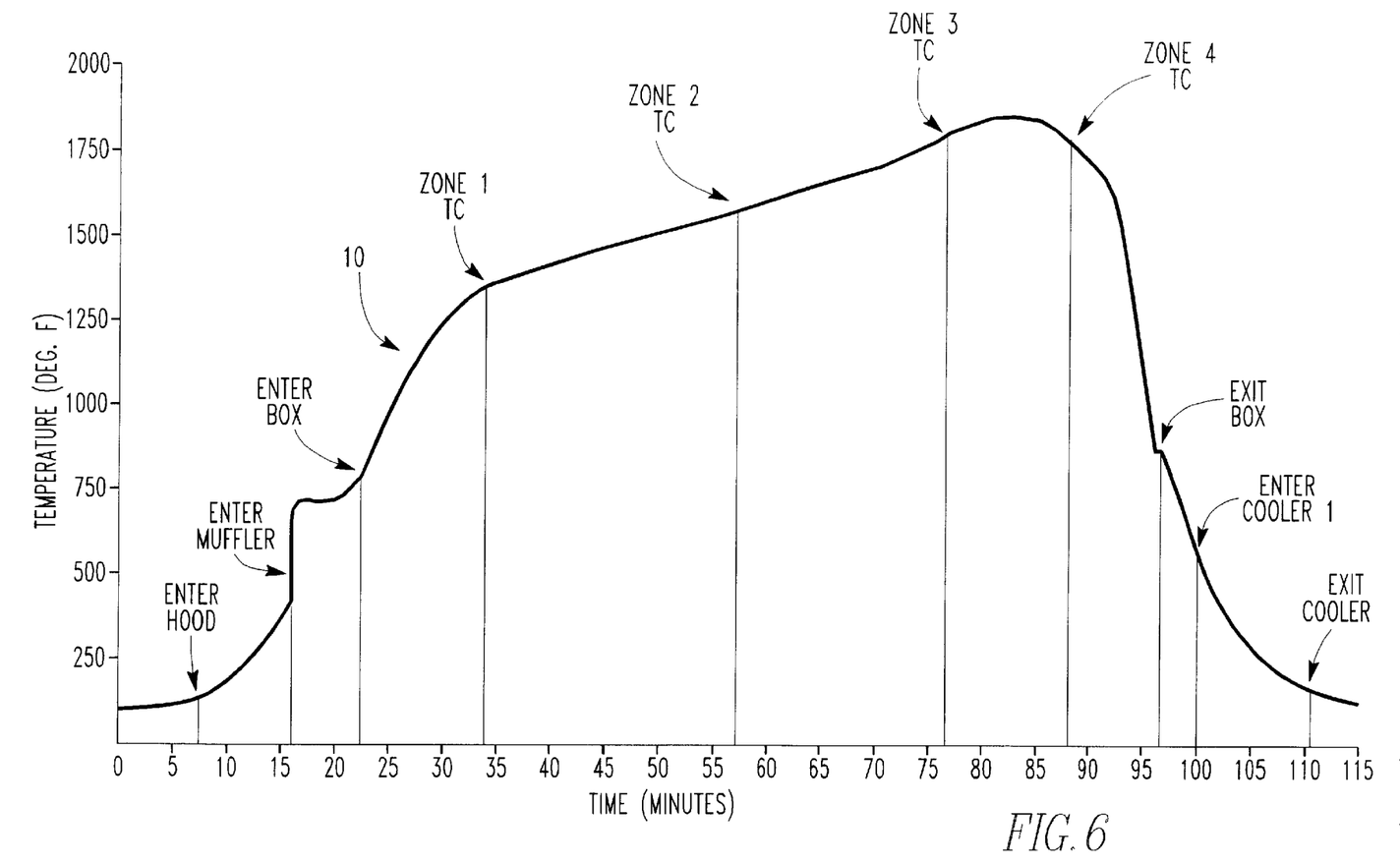
FIG. 6 is a graph of a temperature versus time profile of the furnace illustrated in FIG. 3 used to describe various aspects of the present invention.

FIG. 6 is a graph of a temperature versus time profile of the furnace of FIG. 3. The theory of how the multi-phase aluminum bronze SYM10 is believed to be formed during the sintering cycle, based on the material distribution of the mixture will be described in conjunction with FIG. 5.

FIG. 6 represents a furnace profile completed during sample production of SYM10 grade aluminum bronze material. Sample parts were a standard bushing type. The purpose of the completed test was to record the time/temperature relationships that the material experienced during the sintering process. At approximately 500–800° F. (260°–427° C.) (+10/–0° F.) the lubricant is burned off from the compact. At approximately 1100° F. and 28 minutes into the sintering process, the aluminum bronze material turns white for a very short cycle time, before turning back to a normal color during processing.

At 1100° F. (593° C.), (+10/020 F.) the nickel absorbs the aluminum that has reached a transient liquid state. The theory based on several phase diagrams is 20 to 25% weight of the aluminum combines with the nickel to make the first phase found. The two combine to form a $Ni_3Al$ matrix composite or densified compound. An exothermic reaction creates a high temperature chemical reaction in the compact at approximately 1100° F. (593° C.), (+10/–0° F.), which is indicated by the compact turning white. Microstructure analysis supports the belief that the balance of the aluminum, in the transient liquid state, passes through the iron particles during this temperature range. At this point, the phase that develops into an iron-aluminum metallic compound, namely $FeAl_3$ begins to form.

At approximately 1600° F. (871° C.), (+10/–0° F.), a chemical alloying process change occurs which involves the copper, Ni3Al composite and the FeAl3 compound. Apparently, the control of the normal bronze structure, at this temperature, for Alpha grain size has been changed. While the pore structure is still rounded with improved mechanical properties, the material that is the subject of the present invention has small more defined grain structure or size with favorable necking and grain boundary bonding. Typical good Alpha structure in bronze would also include growth in size and distortion of the part that requires a secondary coining operation. The material of the present invention shows a shrinkage factor and not growth with distortions.

At approximately 1680° F.–1825° (916°–996° C.), (+10/–0° F.) the combining of all of the different phases of structures completes the final alloying. This gives the microstructure the appearance of a multi-phase material. There are several factors that cause the creation of this structure, which differs from a cast structure. The most significant factor is that not all of the raw materials go into a liquid state during this process, while all of the raw materials in a cast material are in a complete liquid state for alloying. Also, another significant factor relating to the creating of the microstructure during alloying is that an exothermic reaction in the DA atmosphere occurs.

Reference arrow 10 marks the chemical and mechanical reaction location that is believed to develop the metallic compound and light color phase in the photomicrograph. After this phase is formed, the part then experiences increased temperatures that complete the additional phases or structure of the material. It is believed that this phase completed at the low temperature defines the grain structure, size, distribution, and grain boundary structure.

Figure 7:
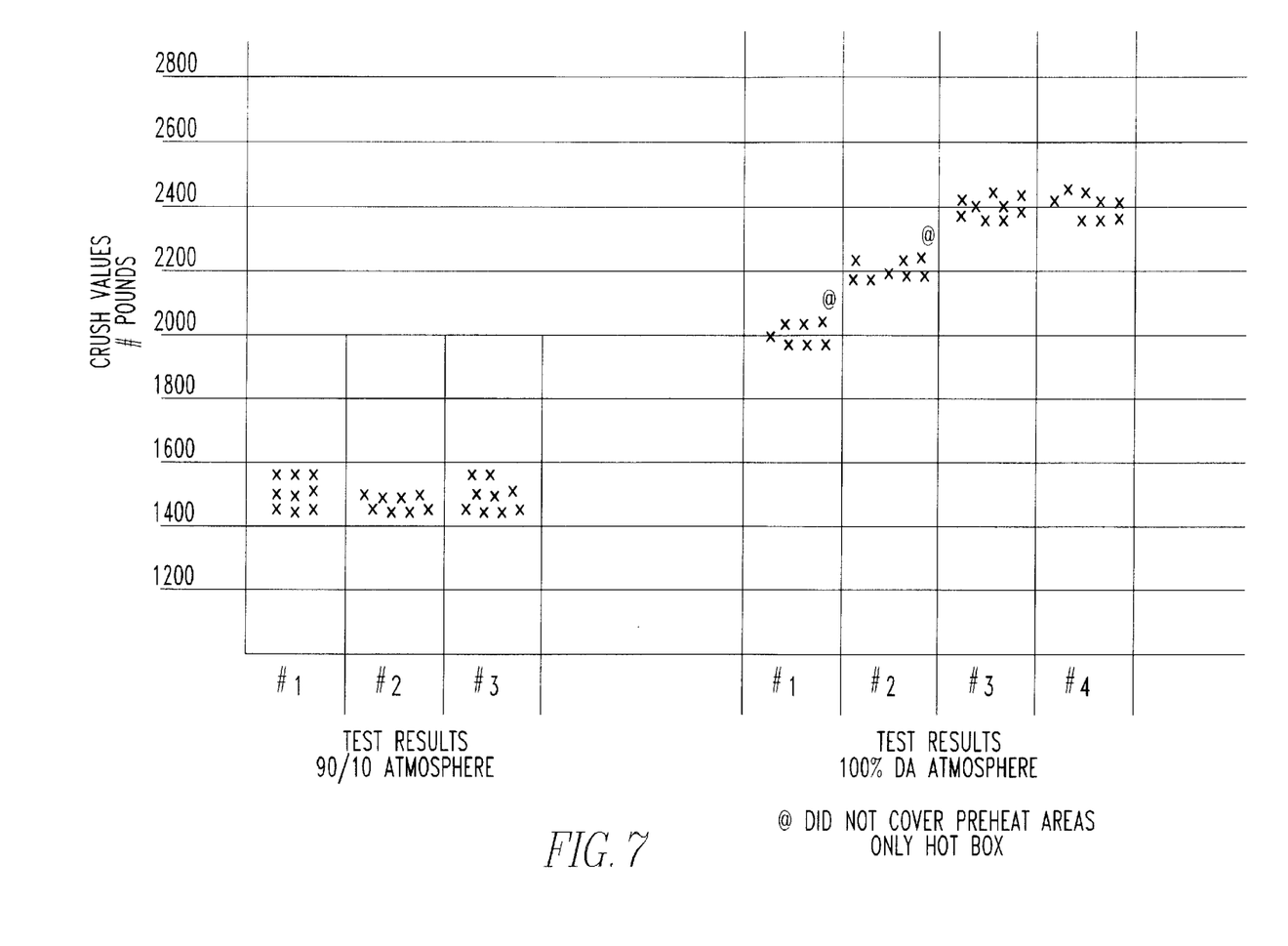
FIG. 7 is a chart comparing the effects on the characteristics of the article which is sintered in a 90/10 $N_2$/DA atmosphere mix versus 100% DA atmosphere.

FIG. 7 is a chart comparing a 90/10 $N_2$/DA atmosphere mix versus 100% DA atmosphere. This chart portrays a 50% increase in the crush capability. Appearance with the 100% DA was also more satisfactory. This is believed to support the theory that the DA was cleaning out, scavenging out or removing the lubricant and any soot in the microstructure of the part prior to diffusion occurring. Tests were completed to confirm that the microstructure was clean of soot or residue, based on DA in the pre-heat area during delubrication. Consequently, it has been hypothesized that the DA must be present in the pre-heat zone. The DA gives the atmosphere a high $H_2$ mixture.

EXAMPLE

Blending Procedure:

Step 1. Properly weigh out each ingredient by percent per volume mixing. Example: 3,000# mix to be completed.
2,400#=Cu 150 RXM-123@80%
330#=Al AM650Std@11%
150#=Iron Powder Ancormet 101@5%
120#=Nickel Grade 123@4%
75#=Stearic Acid—Not considered as part of the finished % weight after the Sintering process.

Step 2. Add all ingredients into the Blender and mix for 45 min. at normal RPM's.

Step 3. Complete inspection on the Flow Rate and the A.D. of the blend.

Step 4. Complete a visual review of the mix for proper blending. The Blending has been completed, that no single ingredient is definable in the mix. Example would be the ability to visually pick out the Aluminum powder.

Step 5. Inspect the mix for A.D. & Flow rate.

Step 6. Test bars samples must be molded and tested for the following items:
6.1 Dimensional change from die size.
6.2 Crush test for 'K' factor calculations.
6.3 Density distribution.

Molding Procedure: Example used below covers bearing type part.

Step 1. Complete surface area calculation on part to be molded to determined the size/tonnage molding press to be used. The following example denotes the calculation used:
Bearing with 1.500od * 1.000id * 1.0000al [{1.500/2}2 * 3.1416]–[{1.000/2}2 * 3.1416]=Area Area * 20tsi=Reqd. tonnage to mold a 5.4 g/cm3 Density part This bearing requires 19.64 ton's to mold. (0.982in2 * 20tsi=19.64 ton's)

Step 2. Set tooling in required press and adjust to calculated fill depths. Load powder and set mold Overall length.

Step 3. Complete density testing and first part inspection for proper set-up. This inspection covers proper OAL, Part Weight, and Density.

Step 4. Complete production lot quantity and required SPC monitoring data.

Step 5. Special random testing (Once every Six Lots) on green strength, Tonnage to Mold, and green size to die size.

Sintering Procedure:
Step 1. Preset the following items:
 1.1 Belt speed
 1.2 Furnace atmosphere
 1.3 Preheat Zone Temp.
 1.4 Hot Zone Temp.
 1.5 Loading procedure
Step 2. Test parts to assure proper sintering cycles for:
 2.1 Proper structural control
 2.2 Size control
 2.3 Proper hardness/crush ('K' Factor)
Step 3. Complete production lot quantity and required SPC monitoring data.

Refer to FIGS. 4 and 6 for a detailed outline of this process step.

Machining Procedure:

General note: Standard machining practices are used for machining this material. It should be noted that this material would have a normal chip as wrought material does during machining and not the type of chip other powder metal materials in the bronze group have.

When machining this material it should be noted that the pores would not be closed off or smeared over, as normal powder metal bronze does.

Oil Impregnation Procedure:

Standard processing for powder metal bronze is followed for this material also. Load parts into a basket and set basket into the pressure tank. Lock lid into place and draw a vacuum to the normal inch level. Wlien the proper vacuum level is reached dump pre-heated oil into the chamber for impregnation into the pores of the parts. Remove the parts after allowing for a 10 min. soak time in the chamber. Note that the proper unloading procedures must be followed in changing the pressure tank settings and draining the oil. After the parts are removed from the pressure chamber, they are set on a drain board for several hours, allowing the excessive oil to drain off.

Packing/Ship Procedure:

Standards packaging for either dry or oiled parts. No special handling required, unless machined parts have tolerance requirements that special handling in needed to secure the quality of the part.

While the present invention has been described in conjunction with a preferred embodiment, those of ordinary skill in the art will recognize that many modifications and variations are possible. The disclosure and the following claims are intended to cover all modifications and variations.

I claim:

1. A process of forming an article, comprising:
 blending for at least two hours two or more powdered metals to form a blended mixture;
 compacting said blended mixture into a mold thereby forming a compacted mixture; and
 sintering said compacted mixture in an atmosphere of 100% DA using a sintering temperature of 1100° F.

2. A process of forming an article comprising:
 blending two or more powdered metals to form a blended mixture;
 compacting said blended mixture into a mold thereby forming a compacted mixture; and
 sintering said compacted mixture in an atmosphere of 100% DA;
wherein said metals are selected from a group consisting of aluminum, copper, iron and nickel.

3. The process as claimed in claim 2 wherein said metals are blended with a lubricant to form said blended mixture.

4. The process as claimed in claim 3 including the step of removing said compacted mixture from the mold prior to sintering.

5. The process as claimed in claim 2 additionally comprising the step of seasoning a compartment where said sintering occurs with 50% DA and 50% $N_2$ prior to sintering in 100% DA.

6. The process as claimed in claim 2 additionally comprising the step of impregnating the article with a liquid lubricant.

7. The process as claimed in claim 2 wherein said blended mixture consists essentially of 80% copper, 11% aluminum, 5% iron, 4% nickel and lubricant.

8. The process as claimed in claim 7 wherein said lubricant is stearic acid.

9. A process of forming an article of powdered metal, comprising:
 blending metals selected from a group consisting essentially of copper powder, aluminum powder, iron powder and nickel with a lubricant to form a mixture;
 loading under pressure said blended mixture into a die cavity to form a part; and
 sintering said part in a reducing atmosphere comprised essentially of 100% DA.

10. A process as claimed in claim 9 wherein each of said metals in said blended mixture in their free state.

11. A process as claimed in claim 9 wherein said blended mixture consists essentially of 80% copper powder, 11% aluminum powder 5% iron powder and 4% nickel with a lubricant.

12. A process as claimed in claim 9 where said article is sintered at temperature ranges between 1000°–1875° F. (538°–1024° C.).

13. A process as claimed in claim 9 wherein said lubricant is stearic acid.

14. A process as claimed in claim 9 additionally comprising the step of seasoning a compartment where said sintering occurs with 50% DA and 50% $N_2$ for 3 hours prior to sintering.

15. A process as claimed in claim 9 additionally comprising the steps of impregnating the article with a liquid lubricant.

16. A sintered powdered metal part, comprising:
 a plurality of metal powders formed into the shape of said part, said part being sintered in an atmosphere of DA using a sintering temperature of 1100° F.; and
 said part comprising a multi-phase microstructure.

17. A sintered powdered metal part comprising:
 a plurality of metal powders formed into the shape of said part, said part being sintered in an atmosphere of DA; and
 said part comprising a multi-phase microstructure;
wherein said plurality of metal powders consist essentially of, by % per volume mixing, 80% copper, 11% aluminum, 5% iron, and 4% nickel.

18. The sintered powdered metal part as claimed in claim 17 wherein each of said plurality of metal powders are in their free state.

19. The sintered powdered metal part as claimed in claim 17 wherein said sintering atmosphere is essentially 100% DA.

20. The sintered powdered metal part as claimed in claim 17 wherein said part has fully dense properties at 80% density.

21. A powdered metal article, comprising:
 a plurality of powder metals formed into the shape of an article and sintered in an atmosphere of DA using a sintering temperature of 1100° F.;

said article being characterized as having filly dense properties at 80% density and having a crush test value in the range of 1900–2500 lbs.

22. The powdered metal article of claim 21 wherein said article exhibits a multi-phase microstructure.

23. An aluminum bronze powdered metal article, comprising:
aluminum, copper, iron and nickel powders formed into the shape of an article and sintered in an atmosphere of DA;
said article being characterized as having fully dense properties of 80% density and having a crush test value in the range of 1900–2500 lbs.

24. The article as claimed in claim 23 wherein said article exhibits a multi-phase microstructure.

25. The part as claimed in claim 23 characterized as having fully dense properties at 80% density.

26. A process comprising:
blending, for approximately two hours, two or more powdered metals to form a blended mixture;
compacting said blended mixture into a mold thereby forming a compacted mixture; and
sintering said compacted mixture in a reducing atmosphere using a sintering temperature of 1100° F.

27. A process comprising:
blending, for at least two hours, two or more powdered metals to form a blended mixture;
compacting said blended mixture into a mold thereby forming a compacted mixture; and
sintering said compacted mixture in a reducing atmosphere;
wherein said powdered metals are selected from a group consisting of aluminum, copper, iron and nickel.

28. The process according to claim 27 wherein said reducing atmosphere is comprised of $H_2$ and $N_2$.

29. The process according to claim 28 wherein said reducing atmosphere comprises at least 75% $H_2$ and at most 25% $N_2$.

30. The process according to claim 27 wherein said blended mixture consists essentially of 80% copper, 11% aluminum, 5% iron and 4% nickel.

31. The process according to claim 27 wherein said powdered metals are blended with a lubricant to form said blended mixture.

32. The process according to claim 27 additionally comprising the step of impregnating the article with a liquid lubricant.

33. The process according to claim 27 additionally comprising the step of seasoning a compartment where said sintering occurs with 50% DA and 50% $N_2$ for approximately 3 hours prior to sintering.

34. The process as claimed in claim 1 wherein said metals are blended with a lubricant to form said blended mixture.

35. The process as claimed in claim 34 including the step of removing said compacted mixture from the mold prior to sintering.

36. The process as claimed in claim 1 additionally comprising the step of seasoning a compartment where said sintering occurs with 50% DA and 50% $N_2$ prior to sintering in 100% DA.

37. The process as claimed in claim 1 additionally comprising the step of impregnating the article with a liquid lubricant.

38. The process as claimed in claim 1 wherein said blended mixture consists essentially of 80% copper, 11% aluminum, 5% iron, 4% nickel and lubricant.

39. The process as claimed in claim 38 wherein said lubricant is stearic acid.

40. The sintered powdered metal part as claimed in claim 16 wherein each of said plurality of metal powders are in their free state.

41. The sintered powdered metal part as claimed in claim 16 wherein said sintering atmosphere is essentially 100% DA.

42. The sintered powdered metal part as claimed in claim 16 wherein said part has fully dense properties at 80% density.

43. The process according to claim 26 wherein said reducing atmosphere is comprised of $H_2$ and $N_2$.

44. The process according to claim 43 wherein said reducing atmosphere comprises at least 75% $H_2$ and at most 25% $N_2$.

45. The process according to claim 26 wherein said blended mixture consists essentially of 80% copper, 11% aluminum, 5% iron and 4% nickel.

46. The process according to claim 26 wherein said powdered metals are blended with a lubricant to form said blended mixture.

47. The process according to claim 26 additionally comprising the step of impregnating the article with a liquid lubricant.

48. The process according to claim 26 additionally comprising the step of seasoning a compartment where said sintering occurs with 50% DA and 50% $N_2$ for approximately 3 hours prior to sintering.

* * * * *

UNITED STATES PATENT AND TRADEMARK OFFICE
CERTIFICATE OF CORRECTION

PATENT NO : 6,132,486
DATED : October 17, 2000
INVENTOR(S) : Dixon

It is certified that error appears in the above-identified patent and that said Letters Patent is hereby corrected as shown below:

Page 1, Line 13, delete [PIM] and insert in its place --P/M--

Page 1, Line 28, delete [$N_2$/A] and insert is its place --$N_2$/DA--

Page 7, Line 23, delete [90/10. $N_2$/DA] and insert in its place --90/10 $N_2$DA--

Page 9, Line 10, delete [(+10/020F.)] and insert in its place --(+10/-0°F)--

Page 9, Line 28, delete [(916°-996°C.)] and insert in its place --(916°-996°C)--

Page 9, Line 28, delete [(+10/-0°F.)] and insert it its place --(+10/-0°F)--

Signed and Sealed this

Eighth Day of May, 2001

*Attest:*

NICHOLAS P. GODICI

*Attesting Officer*     *Acting Director of the United States Patent and Trademark Office*